US012648008B2

(12) United States Patent
Ganesan et al.

(10) Patent No.: US 12,648,008 B2
(45) Date of Patent: Jun. 2, 2026

(54) CONFIGURING A SIDELINK RESOURCE POOL

(71) Applicant: Lenovo (Singapore) Pte. Ltd., New Tech Park (SG)

(72) Inventors: Karthikeyan Ganesan, Kronberg im Taunus (DE); Joachim Löhr, Wiesbaden (DE); Prateek Basu Mallick, Dreieich (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 307 days.

(21) Appl. No.: 18/547,131

(22) PCT Filed: Feb. 18, 2022

(86) PCT No.: PCT/IB2022/051479
§ 371 (c)(1),
(2) Date: Aug. 18, 2023

(87) PCT Pub. No.: WO2022/175894
PCT Pub. Date: Aug. 25, 2022

(65) Prior Publication Data
US 2024/0129936 A1      Apr. 18, 2024

Related U.S. Application Data

(60) Provisional application No. 63/151,417, filed on Feb. 19, 2021.

(51) Int. Cl.
*H04W 72/04*        (2023.01)
*H04W 72/0446*      (2023.01)
(Continued)

(52) U.S. Cl.
CPC ....... *H04W 72/40* (2023.01); *H04W 72/0446* (2013.01); *H04W 72/232* (2023.01)

(58) Field of Classification Search
CPC ........... H04W 72/232; H04W 72/0446; H04W 72/04; H04W 72/40; H04W 72/23;
(Continued)

(56)                References Cited

U.S. PATENT DOCUMENTS

| 2013/0294318 A1* | 11/2013 | Amerga | ................... H04W 4/06 |
| | | | 370/312 |
| 2021/0105787 A1* | 4/2021 | Park | ..................... H04W 72/542 |
| 2022/0086803 A1* | 3/2022 | Li | ..................... H04W 72/0453 |

FOREIGN PATENT DOCUMENTS

| EP | 3993298 A1 | 5/2022 |
| WO | 2021029722 A1 | 2/2021 |

OTHER PUBLICATIONS

PCT/IB2022/051479, "International Search Report and the Written Opinion of the International Searching Authority, or the Declaration", International Searching Authority, May 20, 2022, pp. 1-13.
(Continued)

*Primary Examiner* — Wei Zhao
(74) *Attorney, Agent, or Firm* — Kunzler Needham & Hilton; Bruce R. Needham

(57)                ABSTRACT

Apparatuses, methods, and systems are disclosed for configuring a sidelink resource pool. One method includes receiving, at a user equipment (UE) from a base station, downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination
(Continued)

thereof. The method includes performing a sidelink transmission in the resource pool based on the DCI.

17 Claims, 6 Drawing Sheets

(51) Int. Cl.
H04W 72/232 (2023.01)
H04W 72/40 (2023.01)

(58) Field of Classification Search
CPC .... H04W 72/044; H04L 5/0094; H04L 5/009;
H04L 5/004
See application file for complete search history.

(56) References Cited

OTHER PUBLICATIONS

LG Electronics, "Discussion on physical layer structure for NR sidelink", 3GPP TSG RAN WG1 #99 R1-1913235, Nov. 18-22, 2019, pp. 1-36.

Spreadtrum Communications, "Remaining issues in NR sidelink mode 1 resource allocation", 3GPP TSG RAN WG1 #100bis R1-2002266, Apr. 20-30, 2020, pp. 1-6.

Sharp, "Remaining issues on resource allocation mode 1 for NR sidelink", 3GPP TSG RAN WG1 Meeting #103-e R1-2008388, Oct. 26-Nov. 13, 2020, pp. 1-20.

3GPP, "3rd Generation Partnership Project; Technical Specification Group Radio Access Network; Evolved Universal Terrestrial Radio Access (E-UTRA); Physical layer procedures (Release 16)", 3GPP TS 36.213 V16.4.0, Dec. 2020, pp. 1-576.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

* cited by examiner

100

104

104

102

104

102

102

200

300

400

500

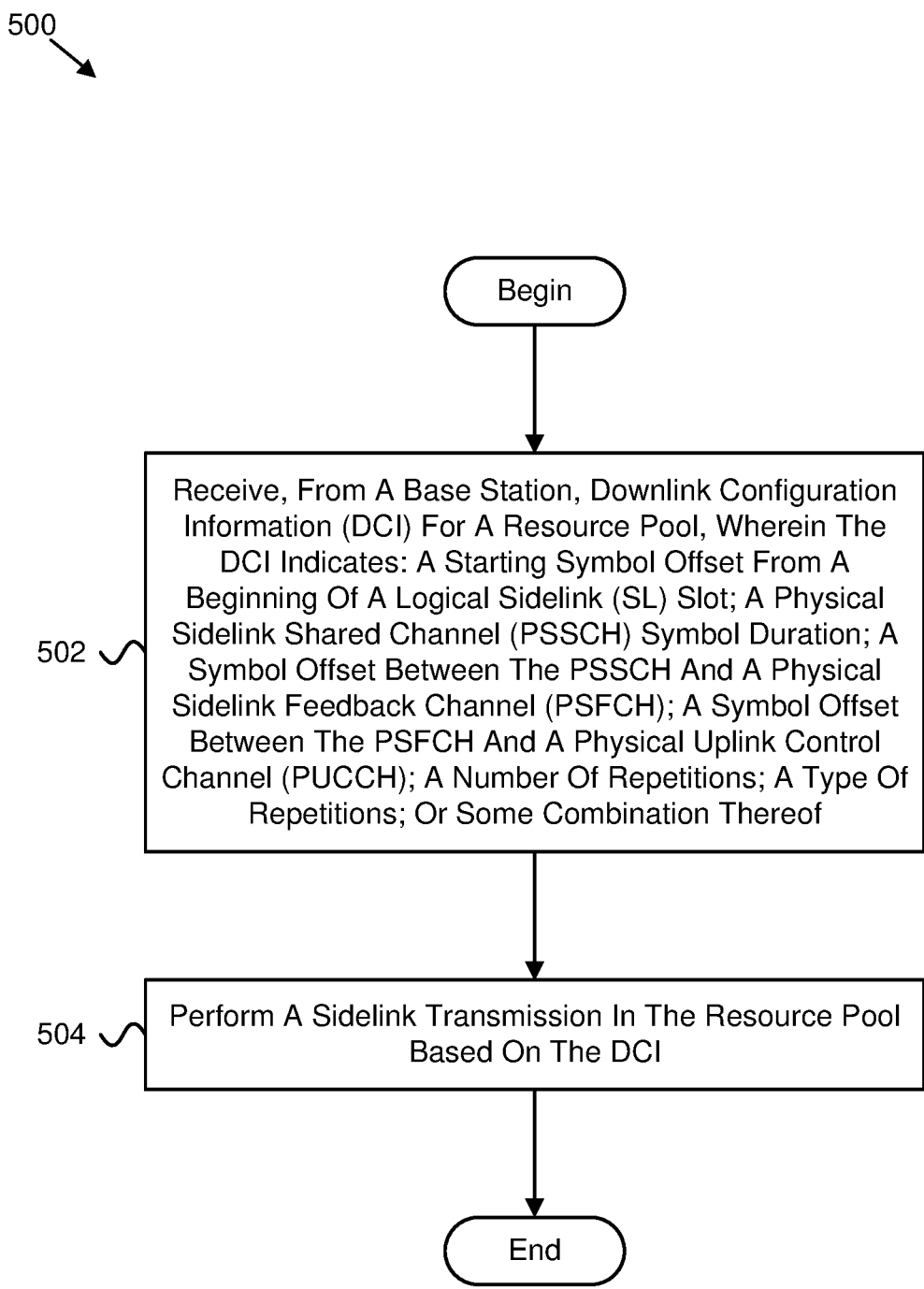

Begin

502   Receive, From A Base Station, Downlink Configuration Information (DCI) For A Resource Pool, Wherein The DCI Indicates: A Starting Symbol Offset From A Beginning Of A Logical Sidelink (SL) Slot; A Physical Sidelink Shared Channel (PSSCH) Symbol Duration; A Symbol Offset Between The PSSCH And A Physical Sidelink Feedback Channel (PSFCH); A Symbol Offset Between The PSFCH And A Physical Uplink Control Channel (PUCCH); A Number Of Repetitions; A Type Of Repetitions; Or Some Combination Thereof 504   Perform A Sidelink Transmission In The Resource Pool Based On The DCI End

FIG. 5

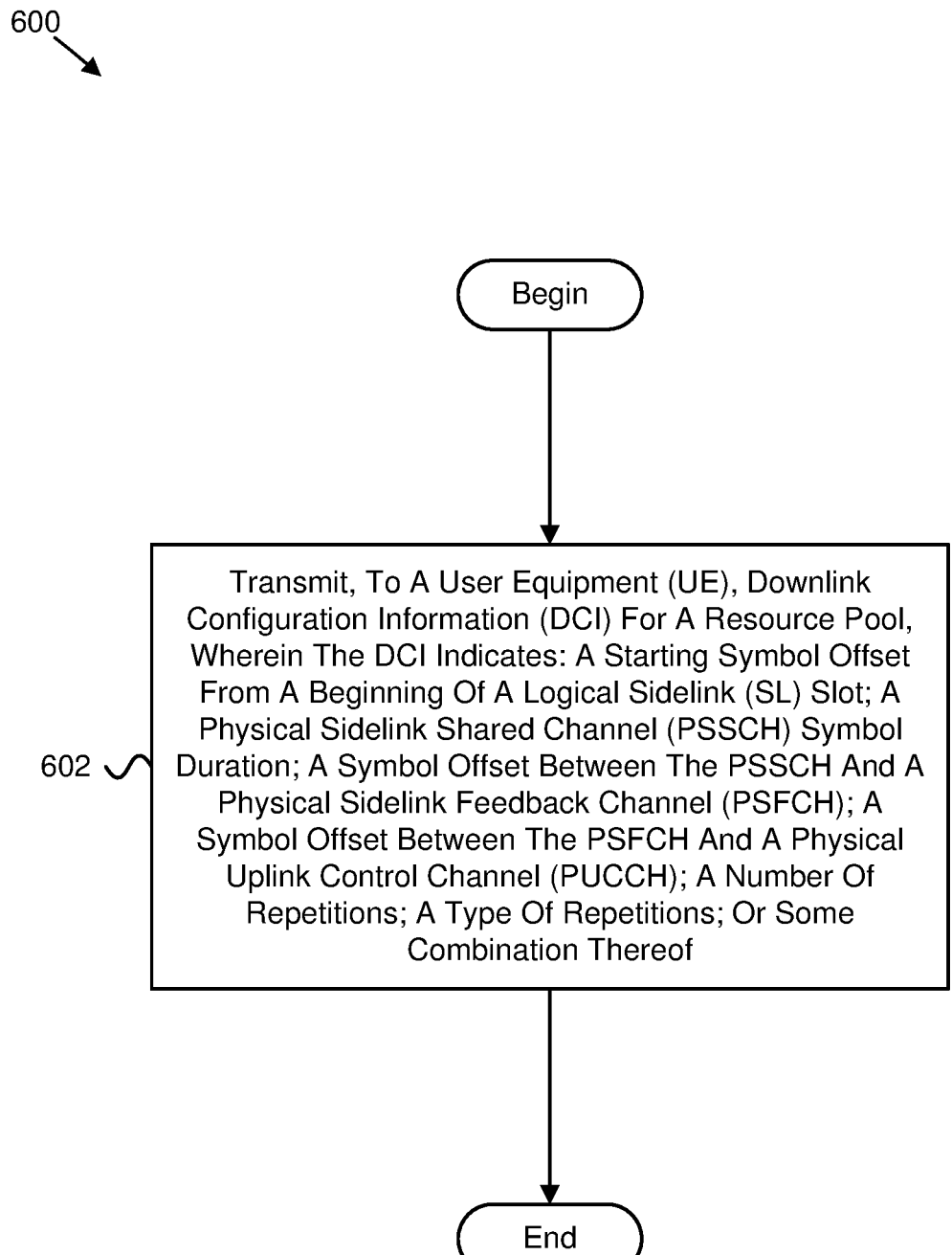

600

602

Begin

Transmit, To A User Equipment (UE), Downlink
Configuration Information (DCI) For A Resource Pool,
Wherein The DCI Indicates: A Starting Symbol Offset
From A Beginning Of A Logical Sidelink (SL) Slot; A
Physical Sidelink Shared Channel (PSSCH) Symbol
Duration; A Symbol Offset Between The PSSCH And A
Physical Sidelink Feedback Channel (PSFCH); A
Symbol Offset Between The PSFCH And A Physical
Uplink Control Channel (PUCCH); A Number Of
Repetitions; A Type Of Repetitions; Or Some
Combination Thereof End

FIG. 6

CONFIGURING A SIDELINK RESOURCE POOL

CROSS-REFERENCE TO RELATED APPLICATIONS

This application claims priority to U.S. Patent Application Ser. No. 63/151,417 entitled "APPARATUSES, METHODS, AND SYSTEMS FOR SIDELINK URLLC ENHANCEMENT CONSIDERING MINISLOT AND REPETITION" and filed on Feb. 19, 2021 for Karthikeyan Ganesan, which is incorporated herein by reference in its entirety.

FIELD

The subject matter disclosed herein relates generally to wireless communications and more particularly relates to configuring a sidelink resource pool.

BACKGROUND

In certain wireless communications networks, resource pools may be used. In such networks, there may be only one sidelink channel monitoring occasion in a logical slot.

BRIEF SUMMARY

Methods for configuring a sidelink resource pool are disclosed. Apparatuses and systems also perform the functions of the methods. One embodiment of a method includes receiving, at a user equipment (UE) from a base station, downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof. In some embodiments, the method includes performing a sidelink transmission in the resource pool based on the DCI.

One apparatus for configuring a sidelink resource pool includes a user equipment. In some embodiments, the apparatus includes a receiver that receives, from a base station, downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof. In various embodiments, the apparatus includes a processor that performs a sidelink transmission in the resource pool based on the DCI.

Another embodiment of a method for configuring a sidelink resource pool includes transmitting, from a base station to a user equipment (UE), downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof.

Another apparatus for configuring a sidelink resource pool includes a base station. In some embodiments, the apparatus includes a transmitter that transmits, to a user equipment (UE), downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a flow chart diagram illustrating one embodiment of a method for configuring a sidelink resource pool; and FIG. 6 is a flow chart diagram illustrating another embodiment of a method for configuring a sidelink resource pool.

DETAILED DESCRIPTION

Figure 1:
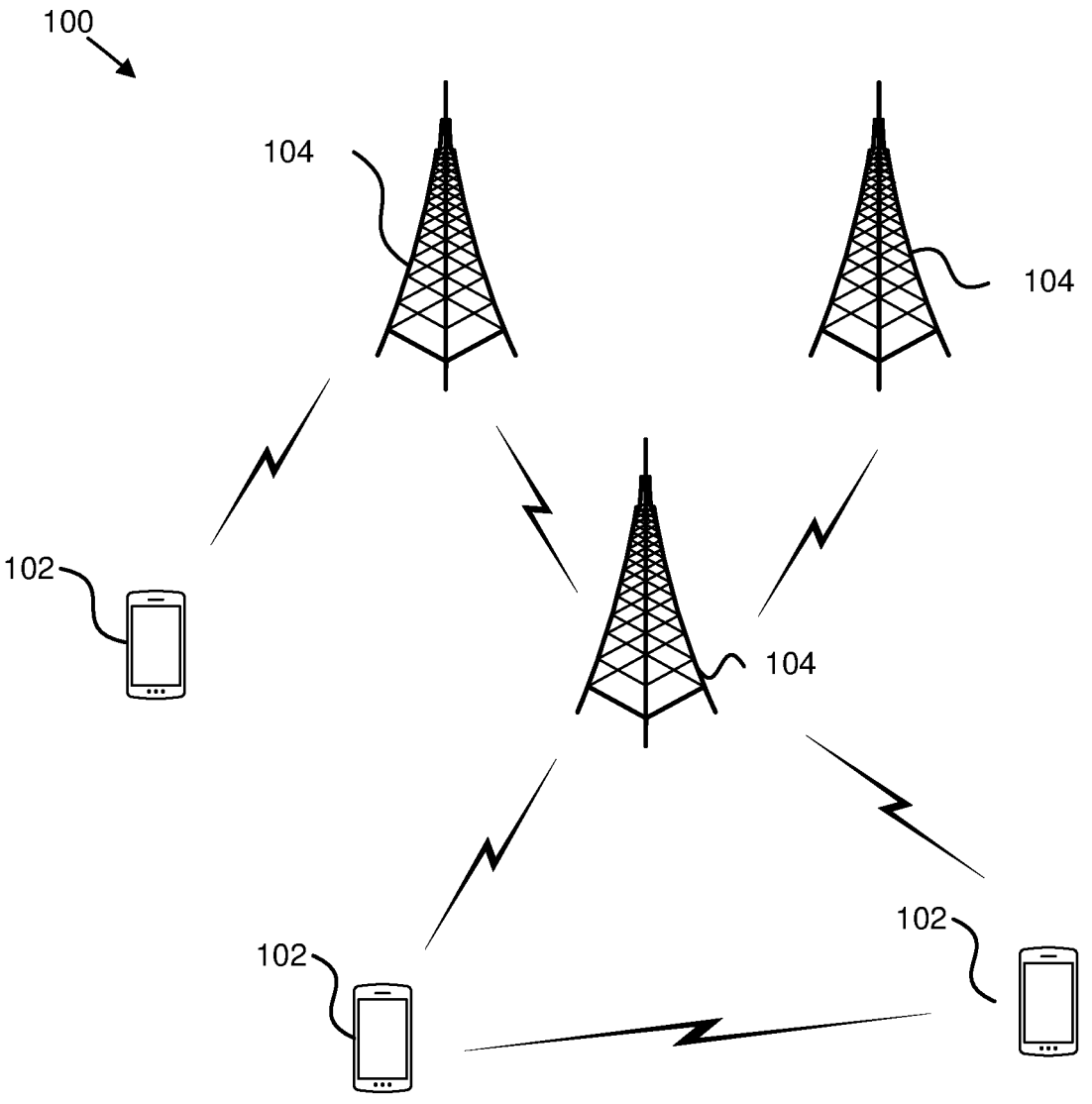
FIG. 1 is a schematic block diagram illustrating one embodiment of a wireless communication system for configuring a sidelink resource pool.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all ofthe items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a sidelink resource pool. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical headmounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment (UE) from a base station, downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof. In some embodiments, the remote unit 102 may perform a sidelink transmission in the resource pool based on the DCI. Accordingly, the remote unit 102 may be used for configuring a sidelink resource pool.

In certain embodiments, a network unit 104 may transmit, from a base station to a user equipment (UE), downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof. Accordingly, the network unit 104 may be used for configuring a sidelink resource pool.

Figure 2:
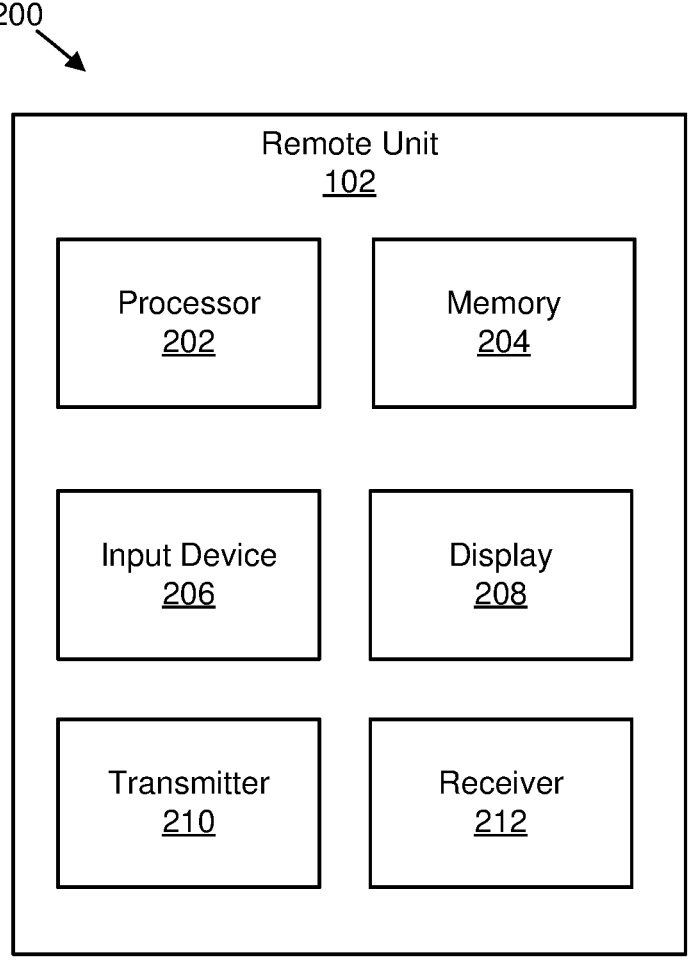
FIG. 2 is a schematic block diagram illustrating one embodiment of an apparatus that may be used for configuring a sidelink resource pool.

FIG. 2 depicts one embodiment of an apparatus 200 that may be used for configuring a sidelink resource pool. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives, from a base station, downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof. In various embodiments, the processor 202 performs a sidelink transmission in the resource pool based on the DCI.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
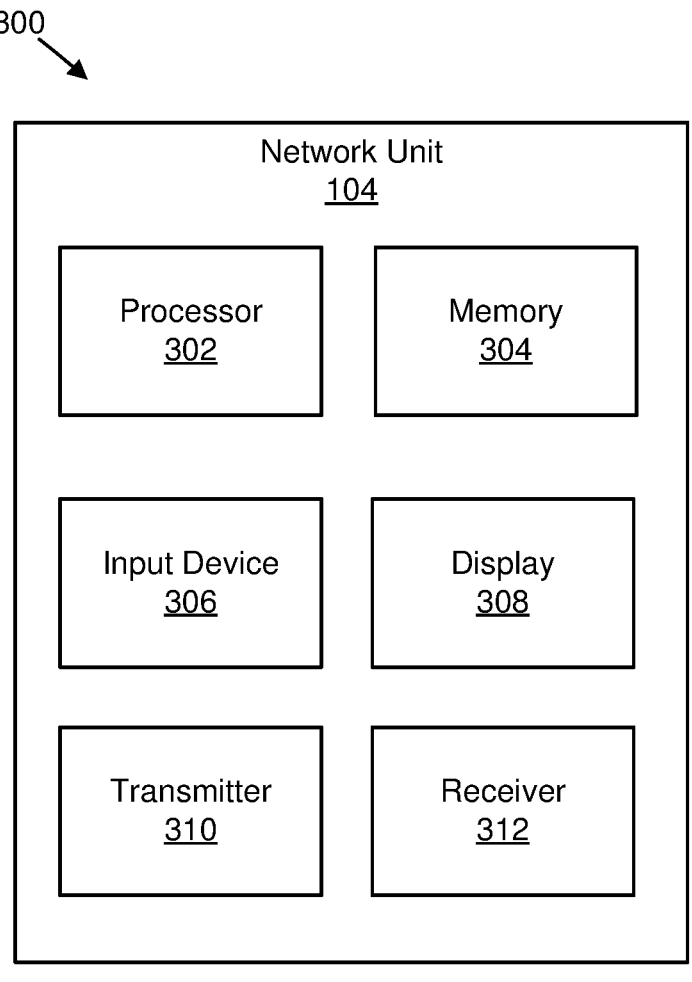
FIG. 3 is a schematic block diagram illustrating one embodiment of an apparatus that may be used for configuring a sidelink resource pool.

FIG. 3 depicts one embodiment of an apparatus 300 that may be used for configuring a sidelink resource pool. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 transmits, to a user equipment (UE), downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof.

In certain embodiments, such as for SL, supporting ultra-reliable low-latency communication ("URLLC") features like mini-slot type transmissions and bundled repetitions may be beneficial for industrial internet of things ("IoT") type applications that require lower latency and higher reliability. In some embodiments, sidelink configuration in a resource pool is limited to one physical sidelink control channel ("PSCCH") monitoring occasion in a logical slot and one physical sidelink shared channel ("PSSCH") symbol duration in a logical slot.

In some embodiments, a sidelink physical layer may be changed due to the introduction of a mini-slot design, and slot and non-slot-based repetitions in a resource pool.

In various embodiments, there may be a resource allocation in a time domain in which: 1) a user equipment ("UE") may transmit PSSCH in the same slot as an associated PSCCH; 2) a minimum resource allocation unit in the time domain is a slot; and/or 3) the UE may transmit the PSSCH in consecutive symbols within the slot, subject to the following restrictions: a) the UE may not transmit PSSCH in symbols which are not configured for sidelink—a symbol is configured for sidelink according to higher layer parameters startSLsymbols and lengthSLsymbols, where startSLsymbols is the symbol index of the first symbol of lengthSLsymbols consecutive symbols configured for sidelink, b) within the slot, PSSCH resource allocation starts at symbol startSLsymbols+1, c) the UE may not transmit PSSCH in symbols that are configured for use by physical sidelink feedback channel ("PSFCH") if PSFCH is configured in this slot, d) the UE may not transmit PSSCH in the last symbol configured for sidelink, and/or e) the UE may not transmit PSSCH in the symbol immediately preceding the symbols which are configured for use by PSFCH if PSFCH is configured in this slot.

In certain embodiments, a new radio ("NR") sidelink physical layer may be changed due to the introduction of a mini-slot design in a resource pool based on: 1) a configuration of one or more parameters for a sidelink time domain resource allocation ("TDRA") table indicated by downlink control information ("DCI") format 3_0 and sidelink control information ("SCI") considering a mini-slot starting symbol, a consecutive symbol duration, a reserved resource indication, and a dynamic indication of sidelink hybrid automatic repeat request ("HARQ") feedback from PSSCH to PSFCH and PSFCH to physical uplink control channel ("PUCCH"); 2) a configuration of mini-slot PSCCH monitoring symbols in a slot per resource pool for sensing UEs; 3) implicit or explicit signaling of a number of repetitions (e.g., parameter K for repetition type A and type B); 4) explicit signaling of repetition type A and B; 5) changes in a transmit ("TX") UE procedure if repetition is configured together with non-consecutive reserved resources; 6) changes in the TX UE procedure for repetition considering a logical sidelink ("SL") slot in a resource pool, a prioritization procedure, and/or invalid symbols; 7) configuration of invalid symbol per resource pool; and/or 8) handling of first SCI and second SCI multiplexing during repetition.

In some embodiments: 1) a mini-slot's starting symbol offset from the beginning of a logical SL slot is defined by S; 2) a mini-slot's PSSCH symbol duration is defined by L consecutive symbols; 3) a symbol offset between DCI and a start of sidelink transmission is defined in terms of KSL; 4) a symbol offset between PSSCH and PSFCH is defined in terms of K1; 5) a symbol offset between PSFCH and PUCCH is defined in terms of K2; 6) a number of repetitions; 7) a type of repetition (e.g., Type A and/or Type B); 8) a time domain allocation for the reserved resources based on sl-MaxNumPerReserve; 9) logical SL slots is defined as the slots within a resource pool; and/or 10) logical SL symbols is defined as the symbols within a resource pool.

In various embodiments, there may be a configuration for sidelink mini-slot design in a resource pool. In certain embodiments, there may be a configuration for a sidelink mini-slot, such as a PSCCH starting symbol offset from a beginning of a sidelink slot boundary defined within a resource pool. In some embodiments, a mini-slot PSCCH starting symbol offset may be derived from startSLsymbols in a resource pool. In various embodiments, indices of logical SL symbols in a slot defined within a resource pool are defined as PSCCH starting symbols for mini-slots.

In certain embodiments, a UE monitors all possible PSCCH monitoring occasions for a mini-slot configured per resource pool for sensing purposes. In some embodiments, there may be a configuration for sidelink mini-slot duration defined as L consecutive SL symbol within a SL slot defined in a resource pool. In various embodiments, one or more lengthSLsymbols may be defined for a SL mini-slot in a resource pool indicating a possible mini-slot length to be used in a resource pool.

In some embodiments, a sidelink TDRA table contains columns containing one or more parameters and multiple combinations related to a mini-slot's starting symbol offset from a beginning of a slot defined by S, a mini-slot's PSSCH symbol duration defined by L consecutive symbols, a number of repetitions, a type of repetition (e.g., Type A and/or Type B), and/or a time domain allocation for reserved resources based on sl-MaxNumPerReserve.

In various embodiments, there may be a subset of a sidelink TDRA table configured per resource pool that is to be used by UEs in a resource pool so that a UE monitors all possible PSCCH monitoring occasions for a mini-slot configured per resource pool for sensing. In certain embodiments, instead of configuring entire columns of a TDRA table in a resource pool, possible combination of parameters of PSCCH monitoring occasions (S) may be defined per logical sidelink slot, one or more mini-slot PSSCH symbol durations may be defined by L consecutive symbols, a symbol offset between PSFCH and PUCCH may be defined in terms of K2, and a symbol offset between PSSCH and PSFCH may be defined in terms of K1.

In certain embodiments, a resource pool may be configured with possible allowed repetitions (e.g., {2,4,8,16}) and/or a type of repetition (e.g., Type A and/or Type B).

In some embodiments, a number of repetition may be defined in a resource pool using a combination of priority values configured by a higher layer and/or based on a channel busy ratio ("CBR"). A UE may implicitly derive a number of repetitions to be performed based on a priority value and/or a CBR.

In various embodiments, a gNB may dynamically indicate in DCI format 3_0 using a row index of a sidelink TDRA table, a new table with columns containing symbol offset between DCI, a start of a sidelink transmission defined in terms of KSL, a symbol offset between PSSCH and PSFCH defined in terms of K1, and/or a symbol offset between PSFCH and PUCCH defined in terms of K2. In certain embodiments, if a SL HARQ feedback is disabled by a TX UE then a UE may ignore a field such as K1.

In some embodiments, SCI may dynamically indicate, in a time domain resource assignment field, a row index of a sidelink TDRA table containing a mini-slot's starting symbol offset from a beginning of a slot defined by S, a mini-slot's PSSCH symbol duration defined by L consecutive symbols, a symbol offset between PSSCH and PSFCH defined in terms of K1 in a separate field in SCI, and/or a type of repetition (e.g., Type A and/or TypeB) in a separate field in SCI.

In various embodiments, a UE is configured with a PSFCH to PUCCH offset in DCI and the UE may autonomously select and signal in SCI a PSSCH to PSFCH feedback value based on allowed values in a resource pool that matches timing of PSFCH to PUCCH. In certain embodiments, a new table containing an allowed PSSCH to PSFCH value for each combination of PSFCH to PUCCH is configured per resource pool and an index of the table is signaled in SCI.

In some embodiments, a minimum time gap is signaled to a gNB considering a DCI processing time of a UE depending on a control resource set ("CORESET"), a search space configuration, and/or a complexity of a physical downlink control channel ("PDCCH") receiver implementation. The minimum time gap may be signaled by the UE as a minimum time gap value or an index to a table containing several values during sidelink capability information transmission or assistance information transmission.

In various embodiments, a gNB signals a repetition version ("RV") sequence pattern identifier ("ID") (e.g., {0,0,0, 0}; {0,3,0,3}; 10,2,3,11) in a DCI field to be used for repetition and/or configured (or preconfigured) per resource pool and autonomously selected and signaled in SCI by a UE.

In certain embodiments, there may be a slot based repetitions (e.g., type-A) in which: 1) the time domain allocation for a first repetition follows a resource assignment signaled in DCI and for the rest of the repetition, the time domain resource is derived from the first repetition and then the UE may repeat a transport block ("TB") across K consecutive logical SL slots applying the same time domain symbol allocation in each logical SL slot according to a resource pool bitmap configuration—the UE may perform all the consecutive repetition within the same resource pool; 2) the UE may not perform repetition in a logical SL slot where symbols within the allocation may later be determined as downlink symbols based on the slot format indicator—the UE may not perform repetition in a logical SL slot where symbols within the allocation may later be determined as sidelink feedback symbols—the UE may not perform repetition in a logical SL slot where symbols within the allocation may later be determined as gap symbols and/or sidelink synchronization symbol block ("SSB") transmission; 3) the UE may not perform repetition in a logical SL slot where symbols within the allocation may later be determined as uplink symbol where the priority of the uplink transmission in the uplink symbol is higher than the priority of the sidelink data transmission—in one implementation, prioritization between UL and SL is performed only once at the beginning of the repetition and that prioritization is used until remaining SL repetition of that TB and, in another implementation, prioritization between UL and SL is performed at each of the repetition occasions of a TB; 4) the UE may not perform repetition in a logical SL slot where symbols within the allocation may later be determined as sidelink feedback symbols whose priority determined by the priority of the TB for which the feedback is generated is higher than the priority of the sidelink data transmission; and/or 5) the UE transmits first ("1st") SCI and second ("2nd") SCI for each of the repetition occasion in consecutive logical SL slots defined by a resource pool.

In some embodiments, there may be a configuration of repetition with reserved resources in which: 1) if sl-MaxNumPerReserve>1 then the time domain allocation for an actual number of repetitions equaling sl-MaxNumPerReserve follows resource assignment signaled in DCI and for the remaining actual repetitions the time domain resource is derived either from the first reserved resource or one of the previous or last reserved resources; 2) the UE may be signaled with a reserved resource explicitly for each of the repetitions using a TDRA table; 3) if the sl-MaxNumPerReserve<number of repetitions, the UE terminates the actual repetition according to the value configured by sl-MaxNumPerReserve—if the sl-MaxNumPerReserve>number of repetitions, in one example, an actual number of repetitions of the UE is performed according to sl-MaxNumPerReserve and, in another example, an actual repetition is terminated if it reaches a maximum number and a new TB is transmitted in the remaining reserved resource; and/or 4) the UE is not expected to be configured with a repetition of a TB signaled with a non-consecutive slot of reserved resources—in this case, the UE may skip the SL grant provided by DCI.

In various embodiments, there may be a configuration of repetition with resource reservation interval in which: 1) if sl-MaxNumPerReserve>1, then a resource reservation interval is signaled, and then the UE performs remaining actual repetition in the next reservation period if the packet delay budget ("PDB") allows; and/or 2) if sl-MaxNumPerReserve>1, then the resource reservation interval is signaled, and then the UE performs only a new TB transmission in a next reservation period.

In certain embodiments, there may be a non-slot repetition type B in which: 1) a receiver UE is signaled a type of repetition (e.g., type A or type B) and a nominal number of repetitions is either explicitly signaled in the SCI or implicitly derived based on a priority value and/or a CBR—however, an actual repetition in consecutive symbols in a logical SL slot depends on the slot boundary defined per a resource pool, invalid symbols are configured per resource pool where the invalid symbols may be derived based on switching gaps inside a SL logical slots, sidelink symbols in a slot that are not covered by the resource pool bitmap configuration, PSFCH symbols and/or automatic gain control ("AGC") symbols and/or sidelink SSB, and/or semi-static and dynamic DL and/or flexible symbols; 2) a time domain allocation for the first repetition follows resource assignment signaled in the DCI and for rest of the actual repetition, the time domain resource is derived from the first repetition, and then the UE may repeat the TB across the K consecutive SL symbols by applying the same symbol allocation in each actual repetition occasion according to a resource pool bitmap configuration—the UE may perform all the consecutive repetitions according to the SL slot defined by a resource pool—the UE may segment the transmission according to the remaining symbols available at the logical SL slot boundary in a resource pool; and/or 3) the UE may signal 1 bit in the SCI about its intention to perform contiguous repetition (e.g., according to the type A and/or type B requirements) in adjacent sidelink symbols in a same logical sidelink slot by overriding and/or transmitting in one or more symbols provided in the invalid symbol configuration. For example, the UE may indicate an overriding indicator in SCI or overriding pattern identifier where a pattern includes overriding one or more symbols in an invalid symbol configuration, which may be configured (or preconfigured) per resource pool. In another example, if repetition is scheduled with DCI format 30, repetition is not expected to collide with the semi-static and dynamic DL and flexible symbols.

Figure 4:
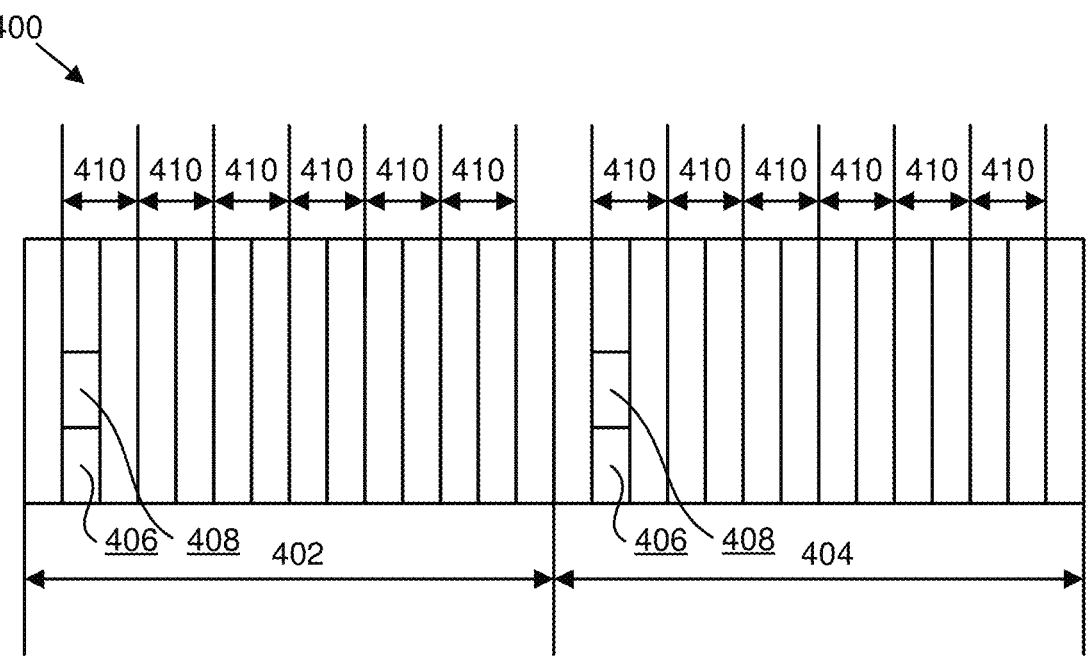
FIG. 4 is a schematic block diagram illustrating one embodiment of a timing diagram showing multiple slots.

In some embodiments, there may be multiplexing of 1st SCI and 2nd SCI together with repetitions. In a first option, in a first repetition, a UE may multiplex repetition of a TB containing 1st SCI and 2nd SCI; however, in the remaining repetitions in the same logical slot, the UE may repeat the same TB without containing 1st SCI and 2nd SCI as shown in FIG. 4. However, if there are still repetitions to be performed in the next logical slot, the UE may again multiplex a first of the remaining repetitions in the next logical slot with 1st SCI and 2nd SCI. With such approach, any receiver UE missing the TB due to half duplex may receive the control data (e.g., 1st SCI and 2nd SCI) in the second slot to decode a remaining repetition in the second slot. The UE signals the RV sequence pattern ID (e.g., {0,0,0,0}; {0,3,0,3}; {0,2,3,1}) in the SCI field to be used for repetition at the beginning of each slot so that if a UE misses the first slot due to a half duplex problem, it may deduce the RV sequence pattern used for the repetition by decoding SCI from the first repetition transmitted in the second slot. The UE is also signaled the RV_current current redundancy version applied for that repetition in the second slot since the actual repetition may vary depending on various conditions.

FIG. 4 is a schematic block diagram illustrating one embodiment of a timing diagram 400 showing multiple slots. The timing diagram 400 illustrates a first slot 402 having 14 symbols, and a second slot 404 having 14 symbols. First SCI 406 and second SCI 408 are multiplexed in certain TBs 410, while other TBs 410 do not include the first SCI 406 and the second SCI 408.

In a second option, in the first repetition, a UE may multiplex a repetition of a TB containing 1st SCI and 2nd SCI; however, in the remaining repetitions in the same logical slot, the UE may repeat the same TB without containing 1st SCI but containing the 2nd SCI. However, if there are still repetitions to be performed in the next logical slot, the UE may again multiplex a first of the remaining repetitions in the next logical slot with 1st SCI and 2nd SCI.

In a third option, in all repetitions the UE may multiplex a TB with 1st SCI and 2nd SCI.

In certain embodiments, in a Mode 2 sensing procedure, a resource selection (or reselection) trigger from a higher layer contains a mini-slot's PSSCH symbol duration (e.g., number of PSSCH symbols) and the candidate resource selection procedure reports a set of resources equal to or greater than the indicated PSSCH symbol duration. The candidate resource exclusion procedure excludes time domain slots and/or frequency resources that are less than the indicated PSSCH symbol duration. A number of nominal repetitions and/or type of repetition (e.g., type A or type B) may be an input parameter provided by a medium access control ("MAC") as part of a resource selection (or reselection) trigger to help the candidate resource selection process to find contiguous resources according to the type of repetition and the number of nominal repetitions. In one implementation, the UE performs resource re-evaluation and preemption check for each of the repetition occasions and, in another implementation, the UE performs resource re-evaluation and preemption check only at the beginning of the first actual repetition and, in a further implementation, the UE performs a resource re-evaluation and preemption check at the beginning of each logical slot.

In some embodiments, if a UE does not find a contiguous resource necessary for performing type A or type B repetition, then Th(pi,pj) is increased by 3 dB for each priority value Th(pi,pj) and the procedure continues. In various embodiments, a UE performs a resource selection (or reselection) trigger again.

In various embodiments, there may be a termination of repetition.

In certain embodiments, groupcast may be used in which a UE detects an acknowledgement ("ACK") for a HARQ process corresponding to a transport block in an expected PSFCH occasion for a group of HARQ feedback option 2 from all group member receive ("RX") UEs.

In some embodiments, a UE does not detect a negative acknowledgement ("NACK") for a HARQ process corresponding to a transport block in an expected PSFCH occasion for a group HARQ feedback option 1 from all group member RX UEs within a minimum communication range ("MCR").

In various embodiments, unicast may be used in which a UE detects an ACK for a HARQ process corresponding to that transport block in an expected PSFCH occasion from an RX UE.

In certain embodiments, for any RV sequence, repetitions may be terminated: 1) after transmitting K nominal repetitions; 2) at a last transmission occasion among the K nominal repetitions within a period P; and/or 3) from a starting symbol of a repetition that overlaps with a PSSCH with the same HARQ process scheduled by DCI format 30 (e.g., whichever is reached first).

In some embodiments, if a parameter repK-RV is provided in a sl-configuredGrantConfig, for the nth transmission occasion among K repetitions, n=1, 2, . . . , K, it is associated with (mod(n−1,4)+1)th value in the configured RV sequence.

In various embodiments, if a sidelink configured grant configuration is configured with a startingFromRV0-r16 set to 'off', the initial transmission of a transport block may only start at the first transmission occasion of the K repetitions, otherwise, the initial transmission of a transport block may start at: 1) a first transmission occasion of K repetitions if a configured RV sequence is {0,2,3,1}; 2) any of the transmission occasions of the K repetitions that are associated with RV=0 if the configured RV sequence is {0,3,0,3}; and/or 3) any of the transmission occasions of the K repetitions if the configured RV sequence is {0,0,0,0}, except the last transmission occasion when K>8 (e.g., where 8 is the maximum of repetitions).

FIG. 5 is a flow chart diagram illustrating one embodiment of a method 500 for configuring a sidelink resource pool. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes receiving 502, at a user equipment (UE) from a base station, downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof. In some embodiments, the method 500 includes performing 504 a sidelink transmission in the resource pool based on the DCI.

In certain embodiments, the method 500 further comprises monitoring a plurality of PSCCH symbols in the logical SL slot based on the DCI. In some embodiments, the DCI comprises a row index of a table. In various embodiments, the table comprises: the starting symbol offset from the beginning of the logical SL slot; the PSSCH symbol duration; the symbol offset between the PSSCH and the PSFCH; the symbol offset between the PSFCH and the PUCCH; the number of repetitions; the type of repetitions; or some combination thereof.

In one embodiment, the method 500 further comprises transmitting sidelink control information (SCI) indicating a row index of a table. In certain embodiments, the method 500 further comprises configuring a nominal number of repetitions in the resource pool. In some embodiments, the nominal number of repetitions is determined based on a priority of a SL transport block (TB), a channel busy ratio (CBR), or a combination thereof.

In various embodiments, the method 500 further comprises determining to skip a type A repetition in the logical SL slot in response to a symbol in the logical SL slot being a SL feedback symbol, a gap symbol, or a combination thereof. In one embodiment, the method 500 further comprises determining to skip a type A repetition in the logical SL slot in response to a symbol in the logical SL slot being prioritized for uplink transmission. In certain embodiments, the method 500 further comprises determining to skip a type A repetition in the logical SL slot in response to a symbol in the logical SL slot being prioritized for SL feedback transmission.

In some embodiments, the method 500 further comprises determining an actual number of repetitions and an actual transmission of repetitions according to reserved resources and a resource reservation interval. In various embodiments, the method 500 further comprises configuring invalid symbols in the resource pool based on a switching gap inside the SL logical slot, a sidelink symbol in a slot that is not covered by the configuration of the resource pool, a PSFCH symbol, an automatic gain control (AGC) symbol, a SL synchronization symbol block (SSB), or some combination thereof. In one embodiment, the method 500 further comprises determining to multiplex first SCI and second SCI with a number of repetitions of a TB.

In certain embodiments: a first repetition of the TB in a first logical slot comprises the first SCI and the second SCI multiplexed with the TB; a second repetition of the TB in the first logical slot does not contain the first SCI and the second SCI; and a third repetition of the TB in a second logical slot comprises the first SCI and the second SCI multiplexed with the TB. In some embodiments: a first repetition of the TB in a first logical slot comprises the first SCI and the second SCI multiplexed with the TB; a second repetition of the TB in the first logical slot comprises the second SCI multiplexed with the TB and does not include the first SCI; and a third repetition of the TB in a second logical slot comprises the first SCI and the second SCI multiplexed with the TB. In various embodiments, each repetition of the TB comprises the first SCI and the second SCI multiplexed with the TB.

FIG. 6 is a flow chart diagram illustrating another embodiment of a method 600 for configuring a sidelink resource pool. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes transmitting 602, from a base station to a user equipment (UE), downlink configuration information (DCI) for a resource pool. The DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof.

In certain embodiments, the DCI comprises a row index of a table. In some embodiments, the table comprises: the starting symbol offset from the beginning of the logical SL slot; the PSSCH symbol duration; the symbol offset between the PSSCH and the PSFCH; the symbol offset between the PSFCH and the PUCCH; the number of repetitions; the type of repetitions; or some combination thereof.

In one embodiment, an apparatus comprises a user equipment (UE). The apparatus further comprising: a receiver that receives, from a base station, downlink configuration information (DCI) for a resource pool, wherein the DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof, and a processor that performs a sidelink transmission in the resource pool based on the DCI.

In certain embodiments, the processor monitors a plurality of PSCCH symbols in the logical SL slot based on the DCI.

In some embodiments, the DCI comprises a row index of a table.

In various embodiments, the table comprises: the starting symbol offset from the beginning of the logical SL slot; the PSSCH symbol duration; the symbol offset between the PSSCH and the PSFCH; the symbol offset between the PSFCH and the PUCCH; the number of repetitions; the type of repetitions; or some combination thereof.

In one embodiment, the apparatus further comprises a transmitter that transmits sidelink control information (SCI) indicating a row index of a table.

In certain embodiments, the processor configures a nominal number of repetitions in the resource pool.

In some embodiments, the nominal number of repetitions is determined based on a priority of a SL transport block (TB), a channel busy ratio (CBR), or a combination thereof.

In various embodiments, the processor determines to skip a type A repetition in the logical SL slot in response to a symbol in the logical SL slot being a SL feedback symbol, a gap symbol, or a combination thereof.

In one embodiment, the processor determines to skip a type A repetition in the logical SL slot in response to a symbol in the logical SL slot being prioritized for uplink transmission.

In certain embodiments, the processor determines to skip a type A repetition in the logical SL slot in response to a symbol in the logical SL slot being prioritized for SL feedback transmission.

In some embodiments, the processor determines an actual number of repetitions and an actual transmission of repetitions according to reserved resources and a resource reservation interval.

In various embodiments, the processor configures invalid symbols in the resource pool based on a switching gap inside the SL logical slot, a sidelink symbol in a slot that is not covered by the configuration of the resource pool, a PSFCH symbol, an automatic gain control (AGC) symbol, a SL synchronization symbol block (SSB), or some combination thereof.

In one embodiment, the processor determines to multiplex first SCI and second SCI with a number of repetitions of a TB.

In certain embodiments: a first repetition of the TB in a first logical slot comprises the first SCI and the second SCI multiplexed with the TB; a second repetition of the TB in the first logical slot does not contain the first SCI and the second SCI; and a third repetition of the TB in a second logical slot comprises the first SCI and the second SCI multiplexed with the TB.

In some embodiments: a first repetition of the TB in a first logical slot comprises the first SCI and the second SCI multiplexed with the TB; a second repetition of the TB in the first logical slot comprises the second SCI multiplexed with the TB and does not include the first SCI; and a third repetition of the TB in a second logical slot comprises the first SCI and the second SCI multiplexed with the TB.

In various embodiments, each repetition of the TB comprises the first SCI and the second SCI multiplexed with the TB.

In one embodiment, a method of a user equipment (UE) comprises: receiving, from a base station, downlink configuration information (DCI) for a resource pool, wherein the DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof; and performing a sidelink transmission in the resource pool based on the DCI.

In certain embodiments, the method further comprises monitoring a plurality of PSCCH symbols in the logical SL slot based on the DCI.

In some embodiments, the DCI comprises a row index of a table.

In various embodiments, the table comprises: the starting symbol offset from the beginning of the logical SL slot; the PSSCH symbol duration; the symbol offset between the PSSCH and the PSFCH; the symbol offset between the PSFCH and the PUCCH; the number of repetitions; the type of repetitions; or some combination thereof.

In one embodiment, the method further comprises transmitting sidelink control information (SCI) indicating a row index of a table.

In certain embodiments, the method further comprises configuring a nominal number of repetitions in the resource pool.

In some embodiments, the nominal number of repetitions is determined based on a priority of a SL transport block (TB), a channel busy ratio (CBR), or a combination thereof.

In various embodiments, the method further comprises determining to skip a type A repetition in the logical SL slot in response to a symbol in the logical SL slot being a SL feedback symbol, a gap symbol, or a combination thereof.

In one embodiment, the method further comprises determining to skip a type A repetition in the logical SL slot in response to a symbol in the logical SL slot being prioritized for uplink transmission.

In certain embodiments, the method further comprises determining to skip a type A repetition in the logical SL slot in response to a symbol in the logical SL slot being prioritized for SL feedback transmission.

In some embodiments, the method further comprises determining an actual number of repetitions and an actual transmission of repetitions according to reserved resources and a resource reservation interval.

In various embodiments, the method further comprises configuring invalid symbols in the resource pool based on a switching gap inside the SL logical slot, a sidelink symbol in a slot that is not covered by the configuration of the resource pool, a PSFCH symbol, an automatic gain control (AGC) symbol, a SL synchronization symbol block (SSB), or some combination thereof.

In one embodiment, the method further comprises determining to multiplex first SCI and second SCI with a number of repetitions of a TB.

In certain embodiments: a first repetition of the TB in a first logical slot comprises the first SCI and the second SCI multiplexed with the TB; a second repetition of the TB in the first logical slot does not contain the first SCI and the second SCI; and a third repetition of the TB in a second logical slot comprises the first SCI and the second SCI multiplexed with the TB.

In some embodiments: a first repetition of the TB in a first logical slot comprises the first SCI and the second SCI multiplexed with the TB; a second repetition of the TB in the first logical slot comprises the second SCI multiplexed with the TB and does not include the first SCI; and a third repetition of the TB in a second logical slot comprises the first SCI and the second SCI multiplexed with the TB.

In various embodiments, each repetition of the TB comprises the first SCI and the second SCI multiplexed with the TB.

In one embodiment, an apparatus comprises a base station. The apparatus further comprises: a transmitter that transmits, to a user equipment (UE), downlink configuration information (DCI) for a resource pool, wherein the DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof.

In certain embodiments, the DCI comprises a row index of a table.

In some embodiments, the table comprises: the starting symbol offset from the beginning of the logical SL slot; the PSSCH symbol duration; the symbol offset between the PSSCH and the PSFCH; the symbol offset between the PSFCH and the PUCCH; the number of repetitions; the type of repetitions; or some combination thereof.

In one embodiment, a method of a base station comprises: transmitting, to a user equipment (UE), downlink configuration information (DCI) for a resource pool, wherein the DCI indicates: a starting symbol offset from a beginning of a logical sidelink (SL) slot; a physical sidelink shared channel (PSSCH) symbol duration; a symbol offset between the PSSCH and a physical sidelink feedback channel (PSFCH); a symbol offset between the PSFCH and a physical uplink control channel (PUCCH); a number of repetitions; a type of repetitions; or some combination thereof.

In certain embodiments, the DCI comprises a row index of a table.

In some embodiments, the table comprises: the starting symbol offset from the beginning of the logical SL slot; the PSSCH symbol duration; the symbol offset between the PSSCH and the PSFCH; the symbol offset between the PSFCH and the PUCCH; the number of repetitions; the type of repetitions; or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive, from a base station, downlink configuration information (DCI), wherein the DCI indicates one or more of:

a starting symbol offset from a beginning of a logical sidelink (SL) slot;

a physical sidelink shared channel (PSSCH) symbol duration;

a symbol offset between the PSSCH and a physical sidelink feedback channel (PSFCH);

a symbol offset between the PSFCH and a physical uplink control channel (PUCCH);

a number of repetitions; or a type of repetitions; and perform a sidelink transmission of a transport block (TB) based on the DCI, wherein the TB comprises first sidelink control information (SCI) and second SCI, wherein the first SCI and the second SCI are multiplexed for the number of repetitions associated with the TB.

2. The UE of claim 1, wherein one or more of:

the at least one processor is configured to cause the UE to monitor a plurality of physical sidelink control channel (PSCCH) symbols in the logical SL slot based on the DCI; or the DCI comprises a row index of a table.

3. The UE of claim 2, wherein the table comprises one or more of:

the starting symbol offset from the beginning of the logical SL slot;

the PSSCH symbol duration;

the symbol offset between the PSSCH and the PSFCH;

the symbol offset between the PSFCH and the PUCCH;

the number of repetitions; or the type of repetitions.

4. The UE of claim 1, wherein the at least one processor is configured to cause the UE to transmit sidelink control information (SCI) indicating a row index of a table.

5. The UE of claim 1, wherein the at least one processor is configured to cause the UE to configure a nominal number of repetitions in the resource pool.

6. The UE of claim 5, wherein the nominal number of repetitions is determined based on one or more of a priority of a SL transport block (TB), or a channel busy ratio (CBR).

7. The UE of claim 1, wherein the at least one processor is configured to cause the UE to one or more of:

determine to skip a type A repetition in the logical SL slot in response to one or more of a symbol in the logical SL slot being a SL feedback symbol, or a gap symbol;

determine to skip a type A repetition in the logical SL slot in response to a symbol in the logical SL slot being prioritized for uplink transmission;

determine to skip a type A repetition in the logical SL slot in response to a symbol in the logical SL slot being prioritized for SL feedback transmission;

determine an actual number of repetitions and an actual transmission of repetitions according to reserved resources and a resource reservation interval; or configure invalid symbols in the resource pool based on a switching gap inside the SL logical slot, a sidelink symbol in a slot that is not covered by the configuration of one or more of the resource pool, a PSFCH symbol, an automatic gain control (AGC) symbol, or a SL synchronization symbol block (SSB).

8. The UE of claim 1, wherein:

a first repetition of the TB in a first logical slot comprises the first SCI and the second SCI multiplexed with the TB;

a second repetition of the TB in the first logical slot does not contain the first SCI and the second SCI; and a third repetition of the TB in a second logical slot comprises the first SCI and the second SCI multiplexed with the TB.

9. The UE of claim 1, wherein:

a first repetition of the TB in a first logical slot comprises the first SCI and the second SCI multiplexed with the TB;

a second repetition of the TB in the first logical slot comprises the second SCI multiplexed with the TB and does not include the first SCI; and a third repetition of the TB in a second logical slot comprises the first SCI and the second SCI multiplexed with the TB.

10. The UE of claim 1, wherein each repetition of the TB comprises the first SCI and the second SCI multiplexed with the TB.

11. A method performed by a user equipment (UE), the method comprising:

receiving, from a base station, downlink configuration information (DCI), wherein the DCI indicates one or more of:

a starting symbol offset from a beginning of a logical sidelink (SL) slot;

a physical sidelink shared channel (PSSCH) symbol duration;

a symbol offset between the PSSCH and a physical sidelink feedback channel (PSFCH);

a symbol offset between the PSFCH and a physical uplink control channel (PUCCH);

a number of repetitions; or a type of repetitions; and performing a sidelink transmission in a resource pool based on the DCI, wherein the TB comprises first sidelink control information (SCI) and second SCI, wherein the first SCI and the second SCI are multiplexed for the number of repetitions associated with the TB.

12. A base station, comprising:

at least one memory; and at least one processor coupled with the at least one memory and configured to cause the base station to:

transmit, to a user equipment (UE), downlink configuration information (DCI), wherein the DCI indicates one or more of:

a starting symbol offset from a beginning of a logical sidelink (SL) slot;

a physical sidelink shared channel (PSSCH) symbol duration;

a symbol offset between the PSSCH and a physical sidelink feedback channel (PSFCH);

a symbol offset between the PSFCH and a physical uplink control channel (PUCCH);

a number of repetitions; or a type of repetitions;

wherein the DCI comprises a row index of a table, and wherein the table comprises one or more of:

the starting symbol offset from the beginning of the logical SL slot;

the PSSCH symbol duration;

the symbol offset between the PSSCH and the PSFCH;

the symbol offset between the PSFCH and the PUCCH;

the number of repetitions; or the type of repetitions.

13. A processor for wireless communication, comprising:

at least one controller coupled with at least one memory and configured to cause the processor to:

receive, from a base station, downlink configuration information (DCI), wherein the DCI indicates one or more of:

a starting symbol offset from a beginning of a logical sidelink (SL) slot;

a physical sidelink shared channel (PSSCH) symbol duration;

a symbol offset between the PSSCH and a physical sidelink feedback channel (PSFCH);

a symbol offset between the PSFCH and a physical uplink control channel (PUCCH);

a number of repetitions; or a type of repetitions; and perform a sidelink transmission in a resource pool based on the DCI, wherein the TB comprises first sidelink control information (SCI) and second SCI, wherein the first SCI and the second SCI are multiplexed for the number of repetitions associated with the TB.

14. The processor of claim 13, wherein one or more of:

the at least one controller is configured to cause the processor to monitor a plurality of physical sidelink control channel (PSCCH) symbols in the logical SL slot based on the DCI; or the DCI comprises a row index of a table.

15. The processor of claim 14, wherein the table comprises one or more of:

the starting symbol offset from the beginning of the logical SL slot;

the PSSCH symbol duration;

the symbol offset between the PSSCH and the PSFCH;

the symbol offset between the PSFCH and the PUCCH;

the number of repetitions; or the type of repetitions.

16. The processor of claim 13, wherein the at least one controller is further configured to cause the processor to transmit sidelink control information (SCI) indicating a row index of a table.

17. The processor of claim 13, wherein the at least one controller is configured to cause the processor to configure a nominal number of repetitions in the resource pool.

* * * * *